(No Model.)

J. ERDODY.
AIR BRAKE.

No. 510,594. Patented Dec. 12, 1893.

Witnesses,

Inventor
Joseph Erdody
By Dewey & Co.
attys

UNITED STATES PATENT OFFICE.

JOSEPH ERDODY, OF SAN FRANCISCO, CALIFORNIA, ASSIGNOR OF ONE-HALF TO JOHN H. CARDOZA, OF SAME PLACE.

AIR-BRAKE.

SPECIFICATION forming part of Letters Patent No. 510,594, dated December 12, 1893.

Application filed November 11, 1892. Serial No. 451,672. (No model.)

*To all whom it may concern:*

Be it known that I, JOSEPH ERDODY, a citizen of the United States, residing in the city and county of San Francisco, State of California, have invented an Improvement in Air-Brakes; and I hereby declare the following to be a full, clear, and exact description of the same.

My invention relates to an air brake apparatus which is especially adapted for use upon electric, cable, or other street cars.

It consists in certain details of construction which will be more fully explained by reference to the accompanying drawings, in which—

Figure 1:
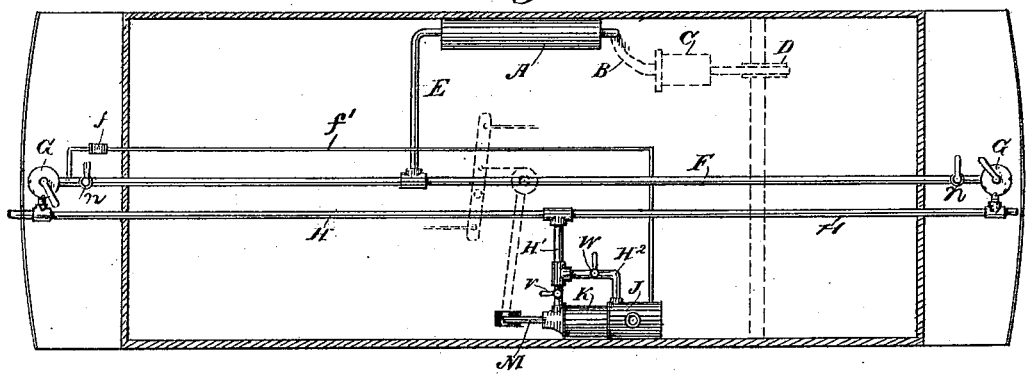
Figure 2:
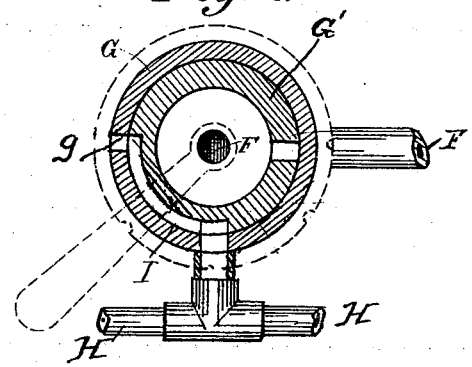
Figure 3:
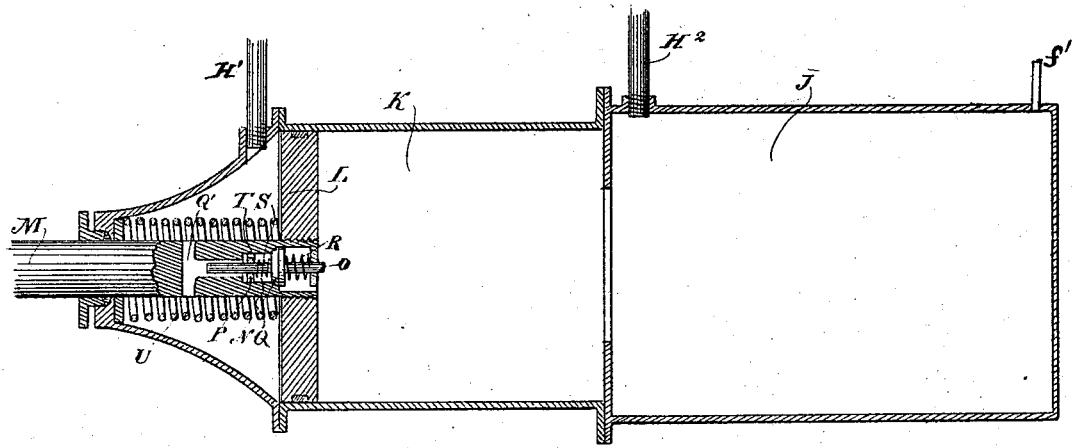

Figure 1 is a plan view of the apparatus. Fig. 2 is an enlarged transverse section of the hand-valve. Fig. 3 is an enlarged longitudinal section of the air reservoir, brake cylinder and connected mechanism.

The object of my invention is to provide a means for applying brakes upon street cars of every description with the least expenditure of power.

In carrying out my invention I employ a main reservoir A which may be fixed at any suitable point about the car, and is connected by a pipe B with the pump C which may also be of any suitable description. This pump has a piston, and is connected through the piston and connecting rods with a crank or eccentric D upon the car axle, so that when the car is in motion, the pump will be operated and as much air compressed into the reservoir as may be needed. From this reservoir a pipe E leads and connects with the pipe F which extends in each direction to the platforms of the car where it is connected with a valve G at each end of the car. Another pipe H is also connected with the valves, and leads to the brake cylinder to be hereinafter-described, and a pipe connected with the pipe H leads to the next car or trailer when two or more cars are connected with one motor car, so that air may be supplied to put the brakes upon this car as well as upon the one carrying the air cylinder and pumping mechanism.

Suitable cocks *n* serve to cut off the air supply in the pipe F from the valve G, and a gage *f* may be employed to show the amount of pressure in the supplemental reservoir J by means of a connecting pipe *f'*. The valve G consists of an exterior cylindrical casing, having two ports made in it, one of which connects with the pipe H and thence to the brake cylinders of the two cars, as previously described, and the other serves as the exhaust port *g*.

G' is a concentric cylindrical plug fitting within the casing G, and the inlet pipe from the air reservoir passes directly up and opens into the center of the plug, as shown at F. Around the periphery of the plug G' is made a groove or channel I of such length that when the plug is turned to the proper position this channel connects with the ports in the outer casing leading to the brake cylinder of the car and the exhaust port. When it is desired to exhaust the air, the plug is turned so as to connect the brake cylinder with the exhaust port, and thus reduce the pressure in the pipe H. A short shaft extends up through the casing G and has a handle by which to turn the plug G'. Notches are made in the periphery of the casing to indicate the location of the ports and lock the handle.

J is a supplemental reservoir, in line with which is a cylinder K having a piston L adapted to reciprocate within it. The space between the supplementel reservoir J and cylinder K is open so as to allow air to pass freely from one to the other.

From the piston L a piston-rod M extends out through the end of the cylinder K which is opposite to the reservoir J, and it connects with the mechanism by which the brakes are applied to the wheels of the car as shown.

The pipe H which admits air to the supplemental reservoir J and cylinder K opens into the end of the cylinder K through which the piston-rod M passes, and the piston L has an inwardly opening valve through which air is allowed to pass into the supplemental reservoir and cylinder until a sufficient amount of pressure is contained within them. In the present case I have shown the valve N as fitted into the end of the piston-rod M which is secured in the piston L. This valve has a stem O passing through a sliding washer P which moves in a cylindrical chamber Q made in the end of the piston-rod and connecting with the chamber in which the valve N moves. A spring R serves to close the valve N against its seat and another light spring S between the valve and the washer P, acts to force this washer toward the end of the chamber in which it moves. This washer has a channel T on one side through which air passes on its way from the pipe H', to the valve N and reservoir when the washer is forced away from its seat by the pressure of air admitted behind it. When this air pressure is cut off, the spring S forces the washer against its seat, and it thus acts to close the small passage through which the air passes to the valve N. As the area of the passage closed by the washer P is smaller than that closed by the valve N, it will be seen that a greater pressure is necessary to move the washer P for the ingress of air, than the pressure which is upon the opposite side of the piston L, and which keeps the valve N closed. The object of this is to insure a greater pressure entering from the pipe H' than that which is constantly in the cylinder K and reservoir J, so that when air is thus admitted it will insure the piston L being forced back to the end of the cylinder, adjacent to the reservoir J, whereas if the valve surface of N, and of the washer P were the same, air would begin to pass through the valve into the reservoir before the piston could be forced to that end of the cylinder. But with this construction the pressure within the reservoir is sufficiently less than that on the opposite side of the piston, in conjunction with that of the spring U, so that the latter pressure can be made sufficient to force the piston to the end of the cylinder adjacent to the reservoir J.

The extension of the chamber Q in the piston-rod has transverse openings Q' connecting it with the space into which the pipe H opens, so that air is admitted through this passage, and passes through an opening T made in one side of the washer P, and thence into the chamber Q behind the valve N. A sufficient amount of pressure raises the valve N and allows the air to flow into the reservoir J where it is stored.

U is a spring of sufficient strength to force the piston L normally to the end of the cylinder K adjacent to the reservoir J, and it remains in this position until the pressure in the reservoir J is sufficient to overcome the tension of the spring. As soon, however, as the plug G' is opened so as to relieve the pressure in the pipe H, the valve N will immediately be seated and prevent any escape of air at this point and the pressure from J will thus force the piston L to the end of the cylinder K most distant from the reservoir J correspondingly compressing the spring U so that through the rod M, power is transmitted to apply the brakes. As soon as air pressure is again admitted through the valve G, until the pressure in the pipe H and the reservoir J is equalized, the piston L will be immediately forced to the end of the cylinder K adjacent to the reservoir J by the action of the spring U and the brakes will be released.

In some cases it may be desired to use the air pressure directly instead of by means of the supplemental reservoir J in which case a cock V in the pipe H is closed, and a cock W in the branch pipe H² is opened. This branch pipe leads into the reservoir J and through it to the adjacent end of the cylinder K, so that when the valve G is opened under these conditions a pressure of air will be admitted directly to act upon the piston L.

Having thus described my invention, what I claim as new, and desire to secure by Letters Patent, is—

1. In an air brake mechanism, a supplemental air reservoir, a brake cylinder having one end in open connection with the reservoir, a pipe supplying air from a main reservoir to the opposite end of the brake cylinder, a piston movable in the cylinder, a valve chamber in the piston and a valve through which air is admitted from the supply pipe to the supplemental reservoir, a washer of smaller area than the valve, controlling the air supply passage to the valve, springs R and S pressing respectively upon the valve and washer, and a spring U acting to normally hold the piston at the end of the cylinder adjacent to the reservoir, until the pressure in the reservoir is greater than the combined pressure of the spring and the air upon the opposite side of the piston, substantially as herein described.

2. In an air brake mechanism, a supplemental air reservoir, a brake cylinder having one end in open connection with the reservoir a pipe supplying air from a main reservoir, to the opposite end of the brake cylinder, a piston movable in the cylinder and a spring by which the piston is normally retained at the end adjacent to the supplemental reservoir, a valve in the piston through which air from the supply pipe passes to the supplemental reservoir, a branch supply pipe leading directly to the supplemental reservoir, cocks V and W by which the supply to the cylinder is cut off and air admitted directly to the supplemental reservoir, and hand valves at opposite ends of the car connecting with the supply pipes and interposed between the main and supplemental reservoirs, substantially as herein described.

In witness whereof I have hereunto set my hand.

JOSEPH ERDODY.

Witnesses:
S. H. NOURSE,
GEO. H. STRONG.